Figure 1:
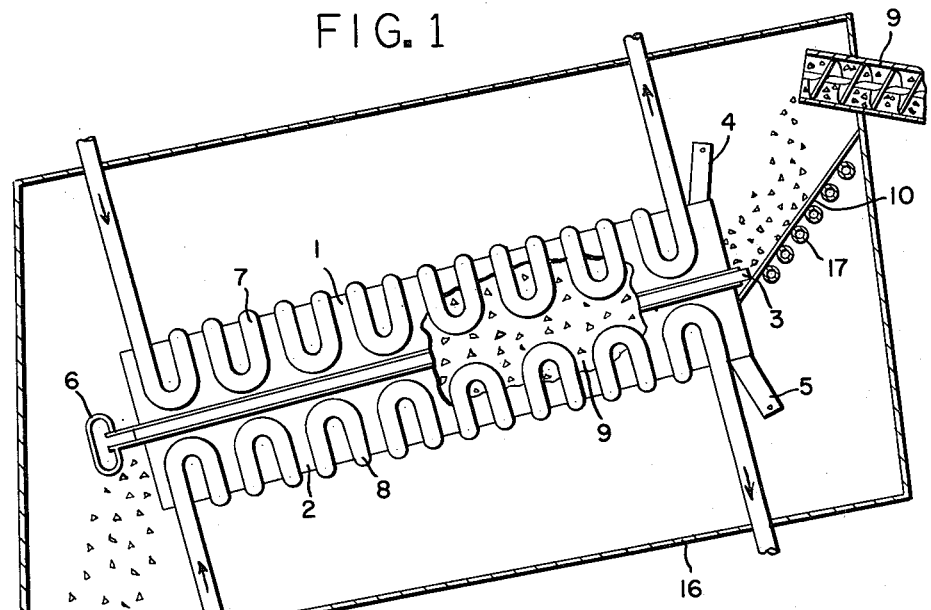

INVENTORS
HENRY S. DOMBROWSKI
FRANK E. EDLIN
BY Francis J. Crowley
ATTORNEY 3,114,626
PRODUCTION OF REFRACTORY METALS
Henry S. Dombrowski and Frank E. Edlin, Wilmington, Del., assignors to E. I. du Pont de Nemours and Company, Wilmington, Del., a corporation of Delaware
Filed Mar. 28, 1957, Ser. No. 649,143
7 Claims. (Cl. 75—10)

This invention pertains to an improvement in the manufacture of pure refractory metals such as titanium, zirconium, vanadium, niobium, chromium, and hafnium.

One of the most widely used processes for the production of refractory metals is by the reduction of the metal halide. Various reducing agents have been used with major emphasis being placed on magnesium and sodium metals. In this process, the halide of the reducing metal is formed, and the refractory metal is obtained as a sponge which is essentially an interlocked mass of crystals of fairly small size. The reaction mixture will contain, in addition to the byproduct salt or salts, excess redundant metals and various halides of the metal produced. The major portion of these products and byproducts can be removed from the refractory metal by conventional separation means, such as decantation, draining or screening. However, it is impossible to completely remove all the undesirable materials in this manner, especially the halide salt of the reducing metal. One of the methods for removing these halide salts is by leaching the sponge metal in an aqueous medium; e.g., a dilute acid solution. This procedure, however, has objectionable limitations. The metal becomes contaminated with oxygen, nitrogen, and hydrogen during contact with the aqueous leaching medium, and these impurities cause the metal to become hard and non-ductile.

It has been found that the amount of oxygen, nitrogen, and hydrogen contamination encountered in the leaching is influenced by the surface area per unit of mass of the crystals making up the sponge. If the surface area of the sponge is kept at a minimum (preferably less than .1 square meter per gram for titanium metal) it is possible to use a leaching step and obtain the desired metal in commercial quality. Surface area determinations are discussed by Emmett in "Industrial Engineering Chemistry," vol. 37, p. 639 (1945).

It is an object of this invention to provide a novel process which effects a purification of refractory sponge metal in particulate form and at the same time quickly reduces its specific surface area. It is a further object of this invention to produce refractory metals in a commercially usable form.

These objects are accomplished by conducting the following operation under an inert atmosphere: introducing dispersed refractory metal sponge particles, obtained from the reduction of the metal halide and containing impurities from the reduction reaction, into one end of an open-ended, walled enclosure, and into a high frequency electromagnetic field sufficient to heat the particles to temperatures from about 600° C. below the melting point of the metal and up to 100° C. above the melting point of the metal, said field being within said enclosure and created by a two-plate parallel inductor. A preferred metal for such treatment is titanium and it is heated to temperatures above 1100° C. and up to 100° C. above the melting point of the metal. When the metal particles are placed within this high frequency field, they vibrate and bounce in a rapid motion between the walls of the enclosure, and a substantial portion of the reaction impurities are vaporized from the particles. The invention offers a wide choice of procedures for disposing of the evolved impurity vapors. If an inert gas is passed through the system or a partial vacuum is maintained, the vapors will be carried out with the flow of gas or drawn out by the vacuum apparatus. At the same time, there may also be some condensation of the vapors on the walls of the enclosure depending upon the temperature at which the walls are maintained. The temperature of the walls may be kept below the dew point of the vapors so that either liquid or solid condensation will be obtained. Liquid condensate may be wiped from the walls while any flake or powder which forms can be removed mechanically by vibrating the enclosure or scraping its walls. It is also possible to insulate and heat the conduit walls above the melting point of the impurities, say 750° C., to minimize condensation and increase the thermal efficiency of the unit. The metal particles which are recovered from the electromagnetic field are cooled to temperatures at which the metal particles are non-reactive to the normal atmosphere, and then they are removed from the inert atmosphere. These particles are free of most of the reduction reaction impurities, but if desired, they may be washed with an aqueous medium, such as water or a 5% nitric acid solution, to further remove residual impurities without simultaneously encountering harmful contamination by oxygen, hydrogen, or nitrogen.

An aqueous acid medium is preferred for washing since certain residual salts can be hydrolyzed by water to form insoluble oxides.

The refractory metal particles are introduced into the electromagnetic field in a dispersed state; that is, the particles are substantially out of contact with each other so as to prevent undue fusion into lumps or a pool of molten metal. This dispersed state may be obtained by sifting or pouring the particles into the field or by releasing them from a conventional conveyer system above to fall on a plate or solid surface from which the particles may bounce or be deflected in a dispersed state into the field for heating as shown in FIG. 1. The above-mentioned plate or solid surface should preferably be of a non-inductive material if it is near the field. The particles may vary in size considerably from dust to lumps. For practical and efficient application of the power used, sizes ranging from 20 mesh to about ⅔ inch in diameter are preferred. For especially uniform treatment, particles of the approximately uniform weight are best. A good practical size range is from 10 mesh to ¼ inch.

In a preferred embodiment, titanium sponge particles produced by the reduction of a titanium chloride in molten salt with magnesium and containing impurities, such as sodium chloride, magnesium chloride and magnesium as a result of the reduction reaction, are introduced in a steady stream into a cooled horizontally inclined conduit which is also an induction coil that produces a high frequency electromagnetic field within the space it encloses. Due to the inclination of the conduit, the particles will move toward the lower end and be discharged after a few seconds retention time in said conduit. However, during this retention period the high frequency electromagnetic field will heat the particles close to the melting point, thus reducing their surface area and also causing impurities to volatilize. Some of the vaporous impurities then condense on the interior surface of the cooled copper conduit, while the other portion is carried out of the space containing the electromagnetic field. The impact of the moving metal particles will dislodge some of these condensed impurities and they will be discharged along with the treated metal. The remaining condensed impurties which are not dislodged by collision with the metal particles may be removed during the operation by scraping or vibrating the conduit, or the operation may be stopped and the walls cleaned. A screw conveyor or other conventional means may be used to convey the particles prior to their dispersion and introduction into the high frequency field, and they may be allowed to fall from the lower end of the conduit into any of several types of coolers. A water-cooled screw conveyor is especially suitable for recovery of the treated product. The operation is conducted in an atmosphere of an inert gas to prevent contamination. When the metal particles are cooled to normal atmospheric temperatures, they are removed from this inert atmosphere and leached with a 5% nitric acid solution without danger of harmful oxygen, nitrogen, or hydrogen contamination.

The length of time during which the metal is allowed to remain in the electromagnetic field (i.e., the hold period) will depend upon the strength of this field which in turn governs the temperature to which the metal is raised, and also upon the particle size, its density, and the proportions of the enclosure. In the preferred aspect of this invention, the electromagnetic field is sufficient to raise the temperature of the metal to the vicinity of its melting point, and the hold period may be as short as 1 or 2 seconds. Of course, a weaker field may be used, and the metal held in the field for longer periods of time. Variations of the field and the hold period to obtain a desired surface area can easily be determined. However, it is more economical to use a field which will raise the temperature of metal to the vicinity of its melting point in the shortest possible time. For this purpose, frequencies of from 100-kc. to 5-mc. will be found to be effective. A preferred frequency range is from 450 to 530 kc. The necessary power will range from 1 to 3 kw. per cubic inch of space within the field.

The following example illustrates the invention in detail:

Example I

Figure 2:
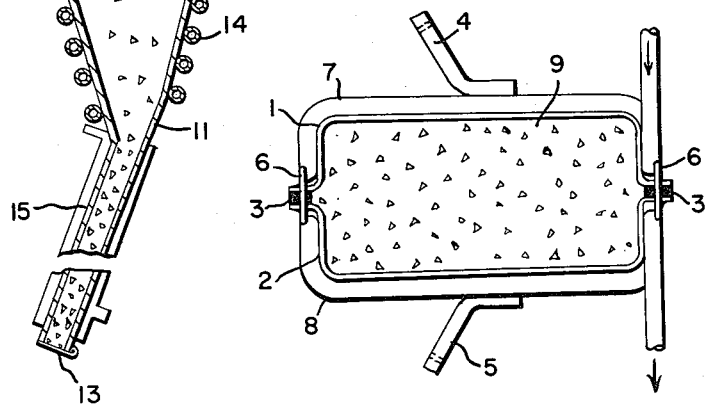

A two-plate parallel inductor was made as shown in the accompanying drawing by bending two 10-gauge copper sheets (plates) 1 and 2 to form a rectangular conduit 8" wide, 1½" high and 12" long. FIGURE 1 is a side elevation of said coil and its accompanying equipment, and FIGURE 2 is a view along the longitudinal axis. The longitudinal edges of the copper sheet were prevented from contacting each other by inserting a non-conductor 3 such as Teflon between them. Water-cooled power leads 4 and 5 from two 50-kw. output high frequency generators at 500-kc. were connected in parallel to the ends of copper plates 1 and 2 respectively. Two copper shorting bars or jumpers 6 connected plates 1 and 2 at their ends opposite the power leads. These shorting bars make the plates into a two-plate parallel inductor. The inductor was cooled by copper-tubing cooling coils 7 and 8 brazed to its exterior surface. The inductor is inclined 5° from the horizontal and vibrated by a "Syntron" vibrator. Titanium particles, ¼" in diameter containing about 70% by weight of Ti, were fed into the conduit at a rate of 7 lbs. per minute. The particles were fed from a screw conveyor 9 onto a silica plate 10 (which is cooled by coils 17) and diverted into the field as shown in FIGURE 1. The discharged particles were collected in a hopper 11 having a discharge gate 13. The hopper was cooled by coils 14 and jacket 15. The whole assembly from the feed conveyor to the cooled hopper was enclosed in a transparent plastic box 16 purged with argon. When the particles 9 entered the field they vibrated so rapidly that although they became heated to incipient fusion temperature of the metal, they did not stick to the walls, nor to each other; and they were promptly discharged along with condensed salts. Retention time in the electromagnetic field was about 4 seconds, and the A.C. power input was measured at 170 kva. The coupling factor (i.e., the energy transmission from the inductor to the metal) was estimated at 70%, and the heat loss from the inductor was estimated at 30-kw. The metal particles and condensed salts were collected and cooled in the argon atmosphere, and after removal from said atmosphere the metal was recovered by screening. Surface area determinations showed that the feed titanium had a specific surface area of 0.45 square meter per gram which was reduced to .035 square meter per gram by treatment in the high frequency electromagnetic field. This is approximately a 13-fold reduction in specific surface area.

When it is desired to obtain as pure a product as possible, the recovered metal should be washed with an aqueous medium, such as water, or a dilute acid; e.g., 5% nitric acid, which will remove any soluble impurities. Because the surface area of the metal per unit mass has been reduced below the critical value for contacting with aqueous media without undesirable contamination, such washing is easily accomplished.

Since the refractory metals are reactive with air at elevated temperatures, it is conventional to use an inert atmosphere when subjecting refractory metals to relatively high temperatures. Gases for this purpose are well known, and among them are included argon, helium, and krypton. To maintain an inert atmosphere, the means of supply and recovery for the metal particles can be in sealed contact with the inductor, and argon can be supplied to the enclosed system. It would also be possible to use an unsealed system and surround it by an atmosphere of the inert gas. When there is a considerable amount of impurity vapor present, little or no inert gas is needed since the vapors furnish the non-reactive atmosphere. The evolution of vapors can be aided by the use of a partial vacuum as high as 25 microns absolute. The temperature at which the metal can be removed from the inert atmosphere will vary with the metal being treated, the impurities present, the specific surface area of the metal, and the particle size of said metal. It is preferred to reduce the temperature of the metal to atmospheric temperatures before removing it from the inert atmosphere. However, the metal may be removed at higher temperatures if one first determines the maximum temperature for non-reactivity under the particular operating conditions.

The two-plate parallel inductor used to produce the high frequency field may be subject to modification. The essence of its structure consists in having two non-contacting faces of a conductor material of similar shape and size positioned opposite each other in parallel planes and separated by an insulating medium at their edges. The faces must be in electrical contact in order to form a closed or inductive "loop" with respect to their respective power leads. The insulating medium separating the faces may be any well known non-conductor material.

While in the example, the high frequency electromagnetic fields is enclosed by plates which are part of the inductor, it is also possible to enclose said field by a conduit of a non-conductor material, such as silica, zirconia, silicon carbide, or titanium nitride. This may be accomplished by inserting the non-conducting conduit within the inductor; for example, a cooled silica conduit, shaped according to the inductor of the accompanying drawing, could be inserted within the latter structure. This modification would, of course, reduce the energy transfer to the metal, but it would also have the salt condense on the silica conduit instead of the plates. When it is desired to heat the conduit, a silica liner may be used to protect metal conductors which would be attacked by the hot impurities; or as an alternative, iron or platinum could be used in the plates without a liner since they are sufficiently resistant to the impurities.

The positioning of the inductor is not critical. It is preferred to have it slightly inclined from the horizontal to effect easy removal of the particles. However, it could be vertical or horizontal provided conditions are adjusted to have sufficient retention time.

Titanium, zirconium, vanadium, niobium, chromium, and hafnium have been mentioned as metals which may be treated by the process of this invention. However, other refractory metals of groups IV, V and VI may be treated in the same manner.

One of the advantages of this invention is the large amount of heating energy which can be applied by a high intensity field in a small treating space. Particles of metal sponge placed in such a high intensity field can be heated to the melting point within a few seconds, thus resulting in a very high speed process utilizing small simple equipment.

The process also has a relatively low conductive heat loss due to the fact that the particles are in a state of motion and only momentarily contacting the cooled enclosing walls. Furthermore, the heat capacity of the unit is very small, and this results in having most of the heating energy transferred to the metal particles rather than being dissipated by the unit.

This application is a continuation-in-part of our copending application Serial No. 554,477, filed December 21, 1955, now abandoned.

We claim:

1. A process for purifying and reducing the surface area of a refractory sponge metal obtained from the reduction of a halide of said metal which comprises maintaining a high frequency electromagnetic field, created by parallelly disposed plates which are connected in series, within an open-ended enclosure containing an inert atmosphere, introducing dispersed particles of said sponge metal into said enclosure and into said field where they are kept in a dispersed state by the vibrating motion imparted to them by the forces of said field, heating the dispersed particles to temperatures ranging from about 600° C. below the melting point of said metal to about 100° C. above said melting point with the energy of said field and vaporizing impurities from said metal particles, withdrawing the particles from said field and then cooling them in an inert atmosphere to a temperature range at which they are essentially non-reactive with the normal atmosphere, and recovering purified refractory metal particles with a reduced surface area.

2. The process of claim 1 in which the refractory metal is titanium.

3. A process for purifying and reducing the surface area of a refractory sponge metal obtained from the reduction of a halide of said metal which comprises maintaining a high frequency electromagnetic field, created by parallelly disposed plates which are connected in series, within an open ended enclosure containing an inert atmosphere, introducing dispersed particles of said sponge metal into said enclosure and into said field where they are kept in a dispersed state by the vibrating motion imparted to them by the forces of said field, heating the dispersed particles to temperatures ranging from about 600° C. below the melting point of said metal to about 100° C. above said melting point with the energy of said field and vaporizing impurities from said metal particles, withdrawing the particles from said field and then cooling them in an inert atmosphere to a temperature range at which they are essentially non-reactive with the normal atmosphere, recovering purified refractory metal particles with a reduced surface area, and washing said metal particles with an aqueous medium.

4. The process of claim 3 in which the refractory metal is titanium.

5. A process for purifying and reducing the surface area of a refractory sponge metal obtained from the reduction of a halide of said metal which comprises maintaining a high frequency electromagnetic field, created by parallelly disposed plates which are connected in series, within an open-ended enclosure containing an inert atmosphere, said enclosure having non-conducting walls within said inductor, introducing dispersed particles of said sponge metal into said enclosure and into said field where they are kept in a dispersed state by the vibrating motion imparted to them by the forces of said field, heating the dispersed particles to temperatures ranging from about 600° C. below the melting point of said metal to about 100° C. above said melting point with the energy of said field and vaporizing impurities from said metal particles, withdrawing the particles from said field and then cooling them in an inert atmosphere to a temperature range at which they are essentially non-reactive with the normal atmosphere, and recovering purified refractory metal particles with a reduced surface area.

6. The process of claim 5 in which the refractory metal is titanium.

7. A process for reducing the surface area of a refractory sponge metal obtained from the reduction of a halide of said metal which comprises maintaining a high frequency electromagnetic field, created by parallelly disposed plates which are connected in series, within an open-ended enclosure containing an inert atmosphere, introducing dispersed particles of said sponge metal into said enclosure and into said field where they are kept in a dispersed state by the vibrating motion imparted to them by the forces of said field, heating the dispersed particles to temperatures ranging from about 600° C. below the melting point of said metal to about 100° C. above said melting point with the energy of said field and then cooling them in an insert atmosphere to a temperature range at which they are essentially non-reactive with the normal atmosphere, and recovering refractory metal particles with a reduced surface area.

References Cited in the file of this patent

UNITED STATES PATENTS

| | | |
|---|---|---|
| 1,966,615 | Croning | July 17, 1934 |
| 2,038,251 | Vogt | Apr. 21, 1936 |
| 2,456,918 | Church | Dec. 21, 1948 |
| 2,489,135 | Himmel et al. | Nov. 22, 1949 |
| 2,686,864 | Wroughton et al. | Aug. 17, 1954 |
| 2,686,865 | Kelly | Aug. 17, 1954 |
| 2,778,726 | Winter et al. | Jan. 22, 1957 |

FOREIGN PATENTS

| | | |
|---|---|---|
| 517,798 | Great Britain | Feb. 8, 1940 |